(12) United States Patent
Osman

(10) Patent No.: US 7,274,299 B2
(45) Date of Patent: Sep. 25, 2007

(54) METHOD OF AND SERVICE ARCHITECTURE FOR REMINDING A USER SUBSCRIBED TO A COMMUNICATION NETWORK

(75) Inventor: Rich Osman, Southlake, TX (US)

(73) Assignee: Nokia Corporation, Espoo (FI)

( * ) Notice: Subject to any disclaimer, the term of this patent is extended or adjusted under 35 U.S.C. 154(b) by 62 days.

(21) Appl. No.: 10/678,221

(22) Filed: Oct. 6, 2003

(65) Prior Publication Data

US 2005/0012611 A1    Jan. 20, 2005

Related U.S. Application Data

(60) Provisional application No. 60/485,491, filed on Jul. 9, 2003.

(51) Int. Cl.
    *G08B 21/00* (2006.01)
(52) U.S. Cl. .............. 340/686.1; 340/539.13; 340/943; 340/994; 340/995; 340/988; 455/414.1; 455/417; 455/466
(58) Field of Classification Search ............ 340/686.1, 340/988, 990, 991, 995.1, 943, 994, 539.13, 340/995; 701/207, 211, 213; 455/414.1, 455/417, 466
    See application file for complete search history.

(56) References Cited

U.S. PATENT DOCUMENTS 4,660,037 A    4/1987  Nakamura

| | | | |
|---|---|---|---|
| 2002/0086680 A1 | 7/2002 | Hunzinger | 455/456 |
| 2002/0087266 A1* | 7/2002 | Sugimoto et al. | 701/207 |
| 2002/0133545 A1* | 9/2002 | Fano et al. | 709/203 |
| 2002/0161633 A1* | 10/2002 | Jacob et al. | 704/14 |
| 2003/0087652 A1* | 5/2003 | Simon et al. | 455/466 |

FOREIGN PATENT DOCUMENTS

| WO | WO 00/22860 | 4/2000 |
|---|---|---|
| WO | WO 00/41313 | 7/2000 |
| WO | WO 02/17654 A2 | 2/2002 |

OTHER PUBLICATIONS

Goran M. Djuknie, Robert E. Richton, "Geolocation and Assisted GPS," *Computer*, vol. 34, No. 2, pp. 123-125, Feb. 2001.

* cited by examiner

*Primary Examiner*—Tai Nguyen
(74) *Attorney, Agent, or Firm*—Squire, Sanders & Dempsey L.L.P.

(57) ABSTRACT

A method of reminding a user subscribed to a communication network, and a corresponding location reminder service architecture is provided. According to one embodiment, the method includes the steps of defining a reminder profile for a specific terminal and of acquiring location information for the specific terminal attached to the communication network. Furthermore, the method involves the steps of comparing the acquired location information with the defined reminder profile, and if the acquired location information matches the defined reminder profile, a step of issuing issues a trigger signaling to at least one user, and an outputting step outputs a reminder notification to at least one user at a respective user terminal.

5 Claims, 8 Drawing Sheets

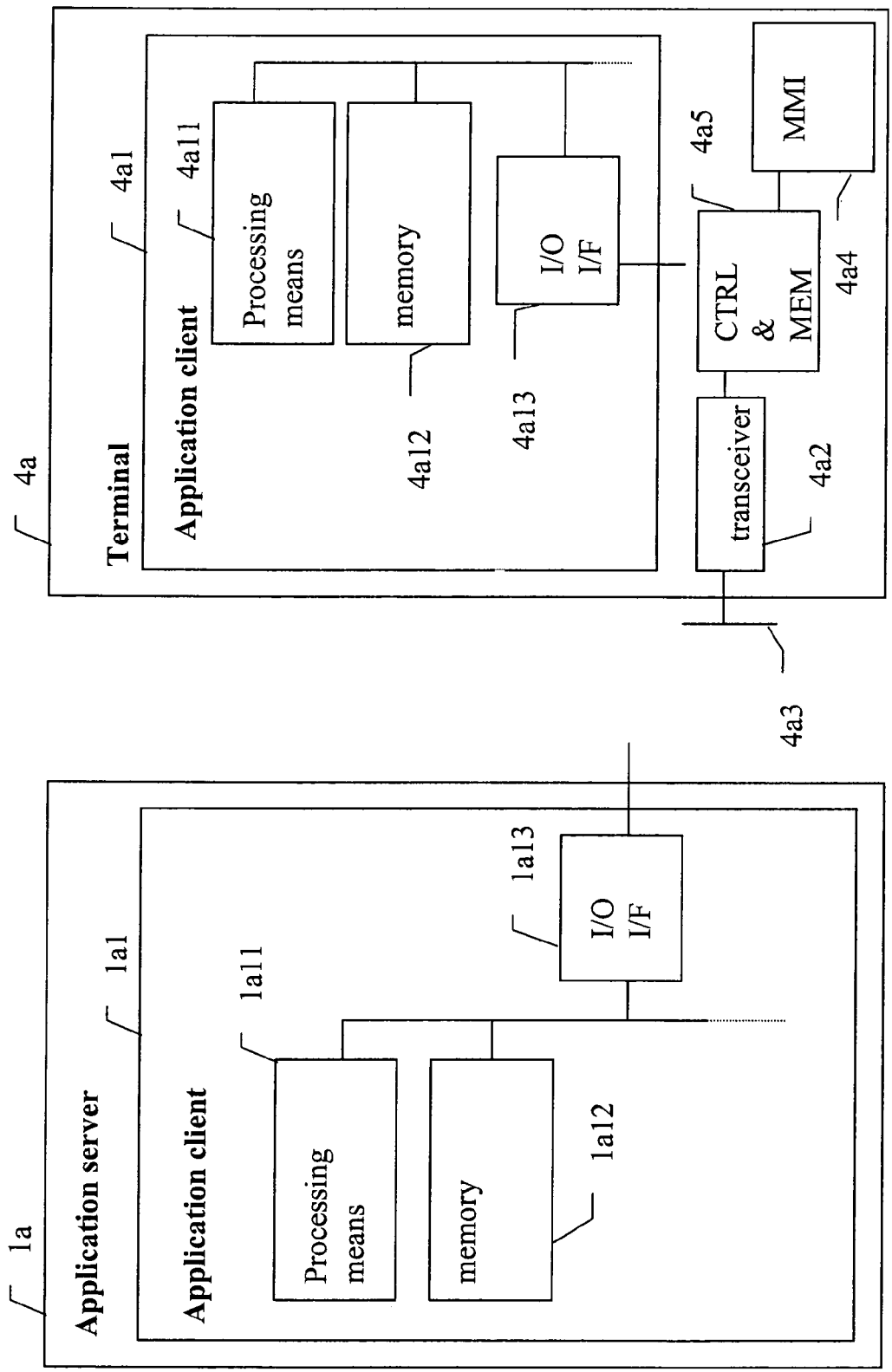

Location Based Reminder Service

Simple Case
Proximity Radius

Complex Case
considers traffic patterns
and contraints

METHOD OF AND SERVICE ARCHITECTURE FOR REMINDING A USER SUBSCRIBED TO A COMMUNICATION NETWORK

CROSS-REFERENCE TO RELATED APPLICATIONS

This application claims priority of U.S. Provisional Application Ser. No. 60/485,491 filed Jul. 9, 2003 entitled, "Method Of Service Architecture For Reminding A User Subscribed To A Communication Network," the entire contents of which are incorporated herein by reference.

BACKGROUND OF THE INVENTION

1. Field of the Invention

The invention relates to a method of reminding a user subscribed to a communication network, as well as to a location reminder service architecture for reminding a user subscribed to a communication network.

2. Description of the Related Art

In recent years, communication technology has widely spread and reached the every-day-life of numerous users which have subscribed to a communication network. Concurrently with the penetration of communication technology, and also mobile communication technology, so-called value-added services were conceived, which offer the users subscribed to a communication network and/or third parties services, which go beyond the mere communication feature as such.

Among such value-added services, so-called location based services are receiving increasing attention. In connection with these location based services, the location and/or position of a user, more precisely, of the user's terminal when attached to the network is determined and exploited for providing specific services to the user and/or a third party (e.g. a network operator).

Throughout the following specification, it is to be noted that when referring to a user, this is to be understood to refer to the user's terminal device. Also, a user subscribed to a communication network signifies that a user may use his terminal for communication purposes or the like involving the communication network architecture provided by the network operator. Such a user or terminal subscribed to a communication network may actively be involved in communication e.g. in an ongoing call, or may assume a stand-by state in which the terminal is enabled to get involved in communication. Such an active as well as a stand-by state is referred to as an attached state. In contrast, a terminal may be detached from the network and thus be disabled from being or getting involved in communication, while it nevertheless remains subscribed to the network.

Also, a position or location of a user's terminal within the communication network may be expressed by coordinates or by a range of coordinates. In order to acquire location information, i.e. for getting or obtaining information descriptive of the position and/or positional range of the user's terminal, geolocation techniques are used. Geolocation techniques are, for example, those known as Global Positioning System (GPS); Assisted-GPS (A-GPS); Observed Time Difference (OTD); Time Of Arrival (TOA); Time Difference of Arrival (TDOA); Angle of Arrival (AOA); multipath fingerprinting; Timing Advance (TA); Enhanced Forward Link Triangulation (E-FLT); Time Difference of Arrival & Received Signal Strength (TDOA&RSS); Time Difference of Arrival & Angle of Arrival (TDOA&AOA); Assisted Forward Link Triangulation & Assisted GPS (A-FLT&A-GPS); and Enhanced Observed time Difference & Assisted GPS (E-OTD&A-GPS). These techniques are known in the art and need not be described here in detail. Nevertheless, a brief introduction to and overview over these different geolocation techniques can be found in the White Paper "Geolocation and Assisted GPS" by Goran M. Djuknic (Bell Laboratories) and Robert E. Richton (Lucent Technologies), retrieved from the Internet under "www.lucent.com-livelink-090094038000e51f_White_paper" on Feb. 27, 2003, which White Paper also lists further references showing that geolocation techniques are well known in the art and do not require further detailed description here. Notwithstanding the above listed geolocation techniques, other geolocation techniques not yet listed above can be applied in connection with the invention to be described later on.

As mentioned above, location based services are currently becoming available to travelers in general and more recently to mobile users of wireless, i.e. mobile communication networks. Examples of the types of services being under development are location specific advertising and direction indications.

Currently, it is common for people to consider doing something "when I'm in the area" and subsequently forget this plan until after the opportunity to realize their plans has passed. Therefore, currently available solutions require the user to manually review and consider stored data. For example, a user might manually check a list of waypoints (intermediate points along a route between departure and destination for course corrections, checks and/or stops) stored in a navigation system or written on a map and decide on his own, if the traveler is close enough to consider including a change in his route either to visit or avoid the location. This, however, imposes an undue burden on the user.

Document WO-A-00/41413 (published Jul. 13, 2000), by P. Karlstedt and assigned to NOKIA Networks Oy, concerns a method for generation and transmission of messages in a mobile telecommunication network. This document describes a message delivery service for generating and delivering messages such as voice or data (SMS) messages to a recipient, in order to reduce the peak traffic load in mobile access networks. Thus, in terms of messages transmitted via the radio link, a statistical distribution over time is achieved. Also, the message is still delivered via the radio interface from the network to the recipient's terminal, only the radio interface between the terminal the position or location of which is monitored and the network is relieved from such messages, so that radio resource are still blocked by such messages. The generation and transmission of the messages is transparent from a user's point of view, i.e. the user of the terminal the position of which is monitored is unaware of the generation or transmission of the messages.

SUMMARY OF THE INVENTION

According to one embodiment of the invention, a method of reminding a user subscribed to a communication network is provided. The method includes the steps of defining a reminder profile for a specific terminal; acquiring location information for the specific terminal attached to the communication network, and comparing the acquired location information with the defined reminder profile. The method also includes the steps of issuing, if the acquired location information matches the defined reminder profile, a trigger signaling to at least one user, and outputting a reminder notification to at least one user at the respective user terminal.

According to another embodiment of the invention, a location reminder service architecture for reminding a user subscribed to a communication network is provided. The architecture includes a definition mechanism, an acquisition mechanism, a comparison mechanism, a trigger signaling output mechanism and an output mechanism. The definition mechanism defines a reminder profile for a specific terminal. The acquisition mechanism acquires location information for the specific terminal attached to the communication network. The comparison mechanism compares the acquired location information with the defined reminder profile. The trigger signaling output mechanism, in response to the acquired location information, matches the defined reminder profile, for outputting a trigger signaling to at least one user. The output mechanism outputs a reminder notification to at least one user at a respective user terminal.

According to the invention, a network element is provided. The network element includes a receiving device, an acquisition device, a comparison device and a trigger signaling output device. The receiver device receives and stores a reminder profile defined for a terminal. The acquisition device acquires location information for the terminal. The comparison device compares the acquired location information with the defined reminder profile. The trigger signaling output device, responsive to an output signal of the comparison device, outputs a trigger signaling.

According to a further embodiment, the trigger signaling output device outputs a trigger signal to the external device of at least one third party's terminal.

According to another embodiment of the invention, provided is a terminal device, including a definition mechanism, an acquisition mechanism, a comparison means, a trigger signaling output mechanism and an output means. The definition mechanism defines a reminder profile for the terminal device. The acquisition mechanism acquires location information for the terminal. The comparison mechanism compares the acquired location information with the defined reminder profile. The trigger signaling output mechanism, in response to an output signal of the comparison mechanism, outputs a trigger signaling, and the output mechanism, in response to the trigger signal, outputs a reminder notification to at least one user at a respective user terminal.

By virtue of certain embodiments of the invention, basically the numerous advantages may be achieved. For example, there is no message delivery, as such. Rather, any information delivered based on location contains signaling information that either indicates location information or positional information so that the terminal determines its location. Therefore, another advantage is that a radio interface located between the network and any terminal is not blocked by message delivery using traffic channels for speech and/or data. Rather, a transmission concerns only signaling channels via the air interface/radio interface.

In addition, what is transmitted in this connection via the signaling channels is either location information to be evaluated at the receiving side or a triggering signal issued based on previously evaluated location information. This feature offers an effective method of saving radio interface resources. For example, by using n bits for coding triggering signals, $2^n$ different events and/or reminder services can be triggered. By providing a signaling message or indication to a user based on a proximity to a location, the user is reminded and prompted to consider an option regarding the user's "behavior" or time schedule. Such a signaling can also be directed to third parties to alert the third parties that the user is approaching a location.

The invention exhibits a particular usefulness when implemented, for example, in a navigation system such as a GPS navigator, and/or in a wireless handset, i.e. a terminal device, at which position information is available. Another example where the invention may be useful is in a wireless network where the knowledge of a user's position is available to the network. Another situation where the invention may be used in a wireless network is where the network stores the user's request for being reminded in a database, i.e. the user specifies the location and/or the profile of proximity to the location to provide the indication (also, the message/notification could be specified), and if the current location matches the specified location and/or profile, the wireless network supplies the reminder indication to the user. Furthermore, based on whether the user accepts or acknowledges the reminder indication, the network further supplies other related information to the user's terminal or to a third party's terminal.

BRIEF DESCRIPTION OF THE DRAWINGS

In the following, the invention will be described in greater detail with reference to the accompanying drawings, wherein:

FIG. 7A shows a basic hardware realization of an application server/application client configured to be used in connection with the invention;

FIG. 7B shows a basic hardware realization of a terminal/application client configured to be used in connection with the invention.

DETAILED DESCRIPTION OF THE PREFERRED EMBODIMENTS

Figure 1:
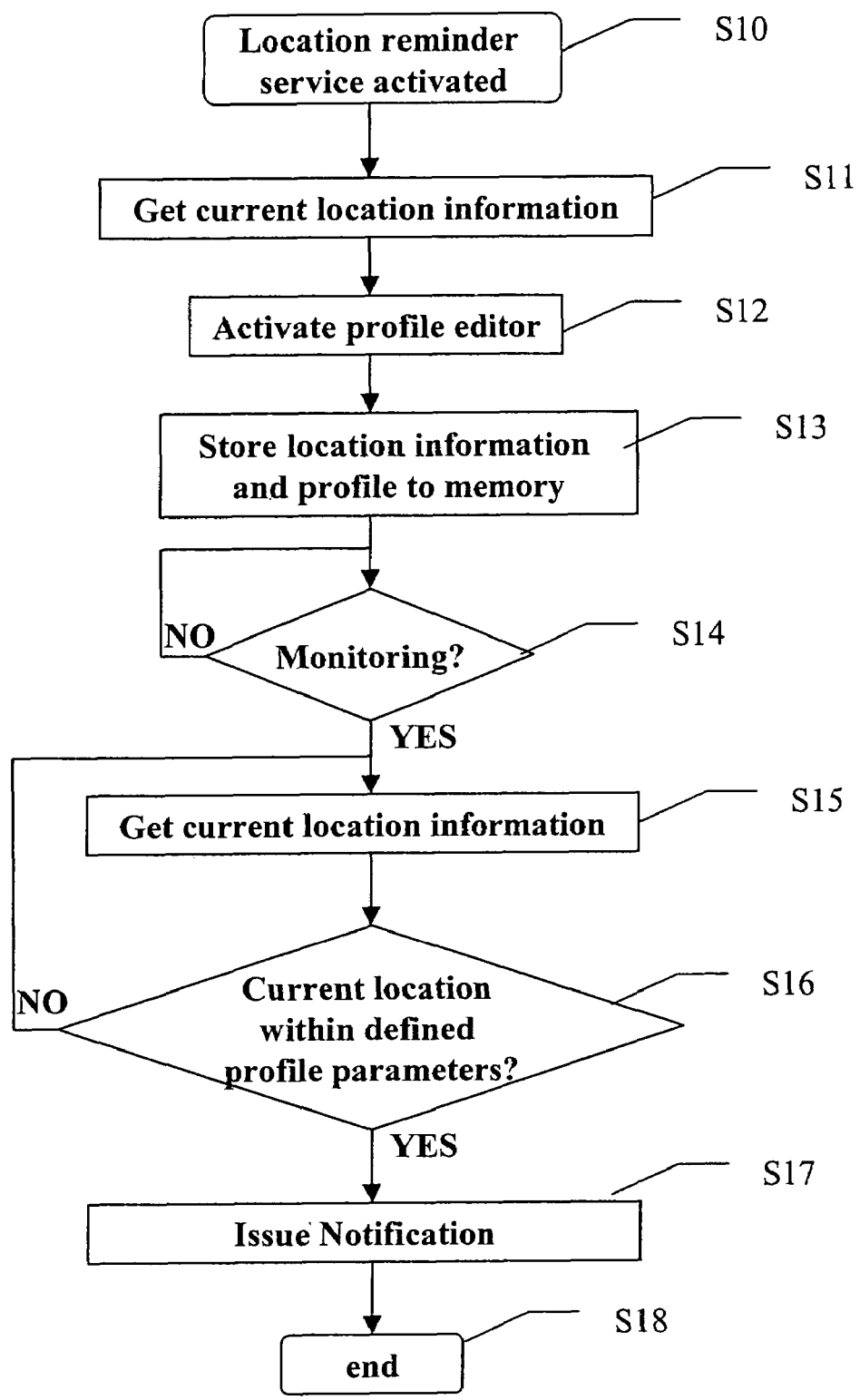
FIG. 1 shows a flowchart outlining the method steps according to the invention.

FIG. 1 shows an example of a flowchart outlining the method steps according to the invention. In step S10 the location reminder service is activated. In a step S11, current location information is obtained. Location information is for example defined as regional and cell ID information and/or actual physical coordinates. The physical coordinates are obtained using one of the geo-location techniques identified below. Namely, this can be accomplished with any suitable geolocation technique, advantageously with one of the aforementioned ones, i.e. using Global Positioning System (GPS); Assisted-GPS (A-GPS); Observed Time Difference (OTD); Time Of Arrival (TOA); Time Difference of Arrival (TDOA); Angle of Arrival (AOA); multipath fingerprinting; Timing Advance (TA); Enhanced Forward Link Triangulation (E-FLT); Time Difference of Arrival & Received Signal Strength (TDOA&RSS); Time Difference of Arrival &

Angle of Arrival (TDOA&AOA); Assisted Forward Link Triangulation & Assisted GPS (A-FLT&A-GPS); or Enhanced Observed time Difference & Assisted GPS (E-OTD&A-GPS). Nevertheless, other suitable geolocation techniques can be applied in connection with the invention. So in step 11, the location information gathered can be any of the following: regional and cell ID, regional and cell ID and coordinates, or just coordinates.

Then in step S12, a profile editor is activated. The profile editor enables a user to edit his reminder profile or even multiple reminder profiles via a man-machine interface such as a display and keyboard or any other suitable input/output mechanism such as a mouse or stylus with touch-screen display or the like.

The editor enables the user to define the reminder profile which includes at least a reminder location, and a spatial reminder range defined with reference to the reminder location. Optionally, the reminder profile further includes a temporal reminder range defined with reference to date and/or time.

This is subsequently explained in greater detail with reference to FIGS. 8A-8B.

Figure 8A:
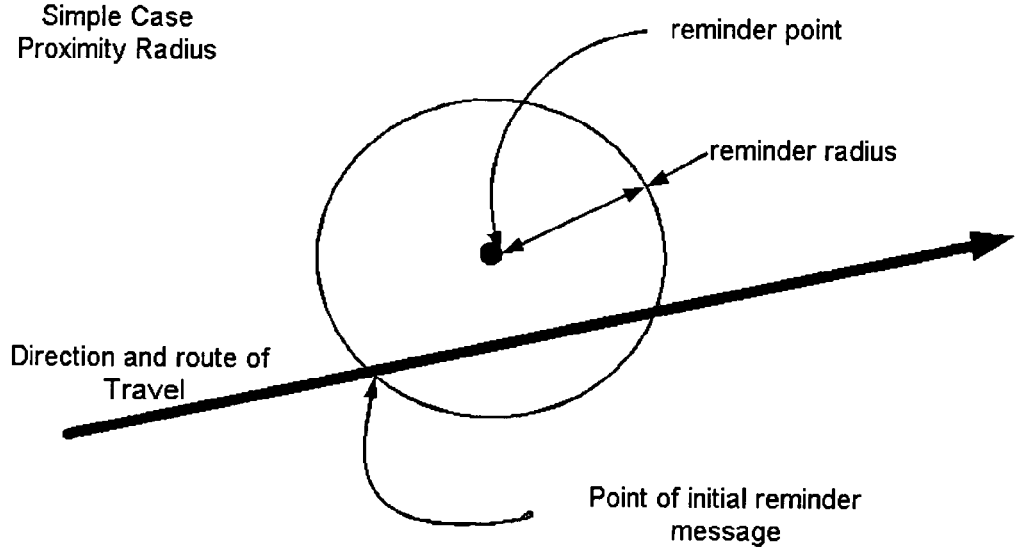
FIG. 8A-8B show examples of reminder profiles from a spatial viewpoint.

FIG. 8A shows an example of a reminder point as a reminder location, around which as a spatial reminder range there is defined a circle having a reminder radius. The reminder boundary around the reminder point is thus centrically arranged and assumes the shape of a circle. Nevertheless, other shapes are possible such as ellipsoid shapes, spline shapes or polygonal shapes or any combination thereof. Also, the reminder boundary need not be defined centrically with respect to the reminder point.

Figure 8B:
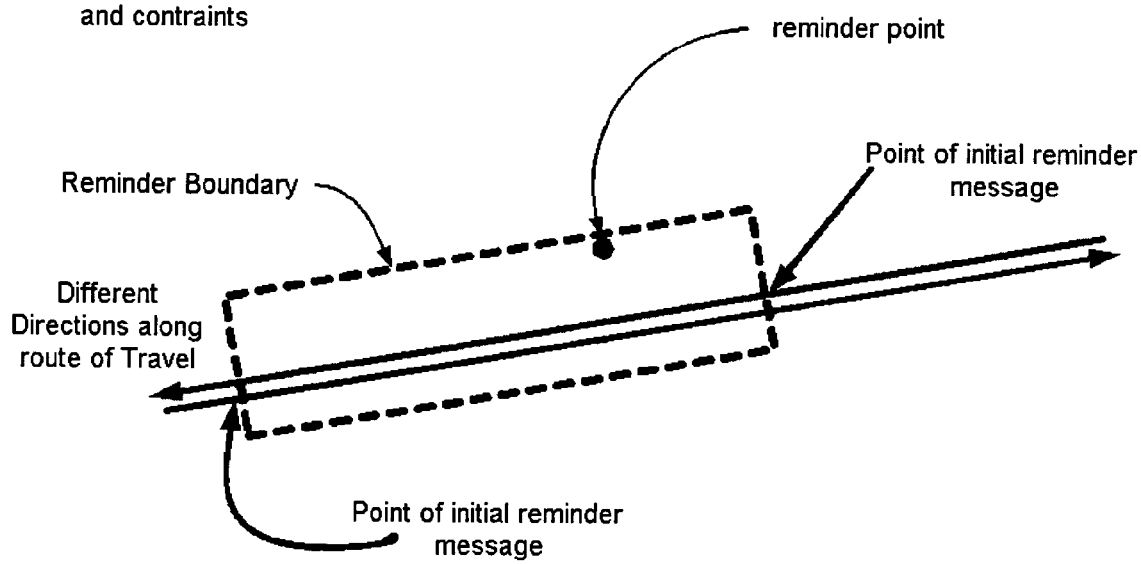

FIG. 8B shows an example of a reminder point as a reminder location, around which as a spatial reminder range a rectangle is defined (as an example of a polygonal shape) as a reminder boundary or reminder range. It is clearly visible that here the reminder boundary is not centrically arranged with regard to the reminder point. When the terminal enters the reminder range (which entry point differs dependent on direction and route of travel), an initial reminder notification is triggered to be issued and/or signaled. The detection of such an entry is performed by comparing the current location with those locations within the reminder range, or with those locations defining the reminder boundary, for example.

Note that FIGS. 8A and 8B only show the spatial aspect of the reminder profile. As mentioned above, also a temporal aspect can be defined. Such a temporal reminder range defined with reference to date and/or time serves as a further filter for a reminder signaling or notification. Assume for example that a point of an initial reminder message is reached on a Monday morning and that a reminder point represents a restaurant. Then, a temporal reminder profile may exclude Mondays from issuing a reminder notification because the restaurant is (assumed to be) closed on Mondays.

Now, returning to FIG. 1, in step S13 the current location information and the (user-) defined reminder profile (spatial and/or temporal) are stored to a memory. If the invention is implemented as a service, a request to bookmark the current location is sent to an application server AS along with the profile information. Then the application server AS queries a location server for the coordinates.

Notwithstanding that according to the above description the AS queries the location server, generally and throughout the description, the AS retrieves location information from the location server, considering that location information can be defined as regional, cell ID information and/or coordinates. Also, it should be noted that in the case of retrieving regional cell ID information, the location server corresponds to simply the HLR. Alternatively, in the case of retrieving coordinates, the location server corresponds to SMLC/GMLC, or if retrieving both, then it is possible to retrieve the location information from both, or just from a single point dependent on a chosen network architecture. Nevertheless, any concept is useable as long as information is retrieved from a location server in the core network which could for example be HLR and/or SMLC/GMLC.

It is not important how the location server gets the coordinates. It uses one of the identified methods and, if necessary, calculations are based on suitably conducted measurements (e.g. from the network and/or from the mobile and/or from position detection system such as GPS). Or alternatively, if the invention is implemented as a feature of the mobile terminal, signal measurements or actual coordinates are obtained from the network, or signal measurements are obtained from GPS, the position is calculated if signal measurements are obtained, and coordinates and profile are stored to memory. Thus, in step S13 the current location is stored and/or bookmarked as a reminder point and other spatial/temporal reminder profile parameters are stored.

Stated in other words, the location information being retrieved is stored as any of the following: regional and cell ID information and/or actual physical coordinates. So with regard to steps S10 to S13 it is clear that, in one embodiment, location information and profile information are retrieved and stored to a memory of the mobile unit, and in another embodiment, a request to bookmark location information and to store all or some profile information are sent to the network and bookmark and profile information are stored to the mobile.

In step S14, it is determined whether monitoring of the location is to be effected or not. This is based on the temporal reminder profile defined. Thus, as described above in this connection, no reminder notification is issued in the case where the temporal reminder profile does not match the current date or current time.

This can be accomplished by preventing the location to be monitored, which is preferred in terms of not unnecessarily monitoring the location and thus wasting these resources which could be used otherwise.

Nevertheless, monitoring can be accomplished independent of the temporal reminder profile, while only issuing the notification would be blocked or impeded based on the temporal reminder profile.

If, in step S14, monitoring is not to be effected, a "NO" response is generated, the method loops back to step S14. If monitoring is to be effected a "YES" response is generated and, the method advances to step S15.

In step S14, there can be one of two ways in which monitoring is initiated. First, the user can define a time when monitoring should begin, for example anytime after today. Second, in the alternative, monitoring can be initiated upon determining that the current regional or cell ID info has changed.

In step S15, the current location information is periodically obtained, e.g. every 15 minutes, or once a day, or the like. The periodicity can be set by the network operator or by the user of the terminal requesting the reminder service dependent on the "event" to be reminded. Also, as a further alternative it is possible that the periodicity is changed dependent on the velocity of the terminal (during traveling, this feature prevents the terminal from passing the reminder location prior to obtaining a new current location). Thus, in step S15, location information for the specific terminal attached to the communication network is acquired. This means that for example, in a most simple version the regional and cell ID information is obtained. Or the regional and cell ID information and the physical coordinates are obtained. Or only the physical coordinates are obtained.

Thereafter, in step S16, the acquired, current location information is compared with the defined parameters, i.e. it is determined whether the defined location is within and/or matches the defined reminder profile, in particular the spatial reminder profile. For example, in the simple version regional and cell ID information may be compared. In a more advanced version, physical coordinates may be compared. Alternatively, regional and cell ID information may be obtained and compared, and if a match occurs, then the physical coordinates may be obtained and compared as a further refinement. If not, (NO in step S16), the method loops back to step S15 where it waits for the next periodical location information acquisition is to be performed. Thus, the loop back to step S15 is delayed by a delay element such as a timer (not shown in the Figure).

This means that in one embodiment, the location server periodically determines when to monitor the location, retrieves information, issues the notification to the mobile and the mobile retrieves whatever information is associated with the bookmarked location. The notification can simply be signaling that the mobile understands and which is associated with the profile information. Or, in another method, the mobile simply periodically monitors, retrieves the location information, analyzes the location information, and retrieves the stored profile information when conditions are met. The process can thus be implemented as a service (within the network), while the process may also be implemented as a feature of a mobile as an alternative.

If the acquired location information matches defined reminder profile (Yes in step S16), the method proceeds to step S17, where a reminder notification is issued.

Subsequently, the method ends in step S118.

Figure 2:
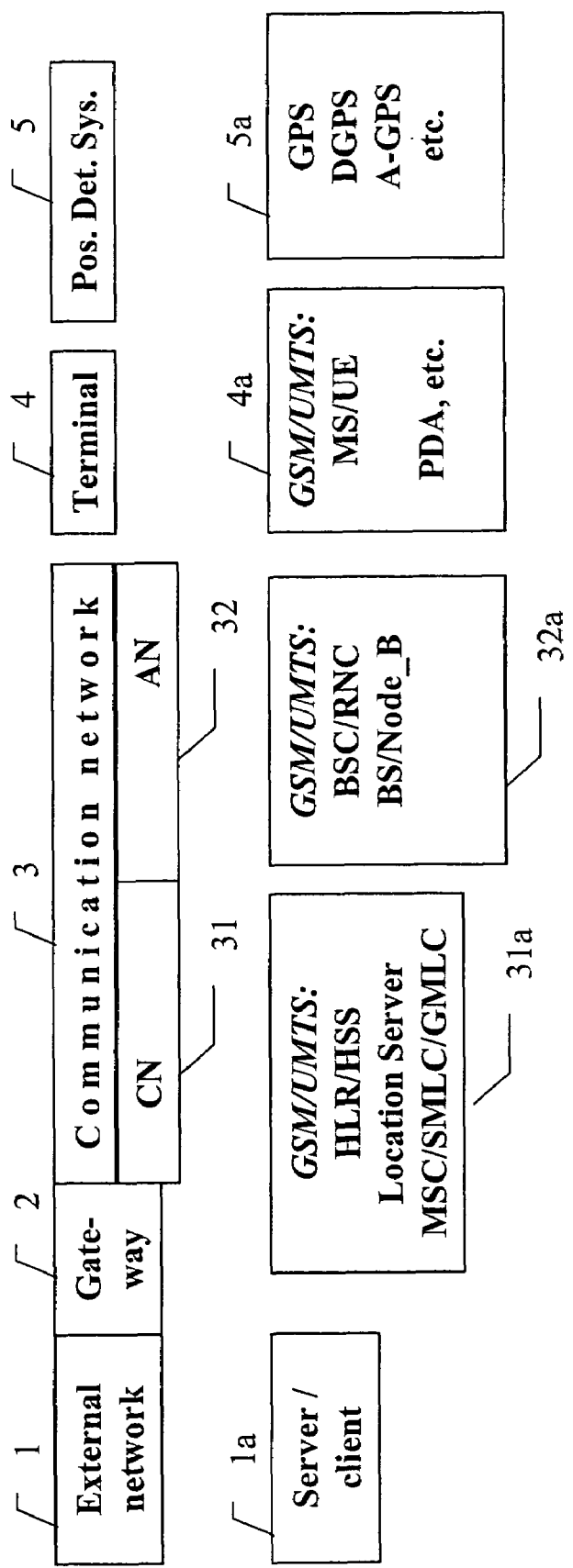
FIG. 2 shows an overview of elements that are (at least some of them at a time) involved in the invention.

FIG. 2, for example, shows an overview of elements involved in the invention. As mentioned above, it is not necessarily the case that all the elements shown are involved in the invention. In particular, a position detection system need not be involved in the case where the geolocation technique used is based on the geolocation information which is available in the communication network itself. In FIG. 2, a location server can have or has access to regional and cell information, which come from a MSC, as well as stemming from any of the algorithms identified above to calculate the actual coordinates. In addition, the location server may have on its own a GPS satellite receiver (as a part of a position detection system) to provide GPS assistance to the mobile (A-GPS). In A-GPS case, the location server does the acquisition of the actual satellites that the mobile will use to obtain timing information so that it calculates its coordinates. This feature greatly reduces the time that it takes for the mobile terminal to calculate its position. Also, the position detection system 5 in FIG. 2 supports the terminal so that the terminal is able to obtain the information necessary to either calculate the coordinates using one of the methods described, such as E-OTD or GPS, or the ability to provide the information necessary for the network to calculate the coordinates using one of the methods described, such as E-OTD or GPS.

Now, as shown in FIG. 2, basically the following elements can be involved in the invention. Namely, an external network 1 such as the Internet or a LAN or the like. Such an external network 1 may contain an application server or application client 1a involved in the invention.

The external network 1 and/or the server/client 1a are connected to a communication network 3 via a gateway 2. The gateway 2 may be considered to be part of the communication network and/or considered to be part of the external network 1 as it constitutes an interface between the communication network and the external network. The application server or client may reside in the core network. Alternatively, the application client may simply be a part of the location server. The communication network 3 may be composed basically of a core network CN 31 and an access network AN 32. The core network CN 31 takes care of the logical administration of the network functions, while the access network AN 32 takes care of the "last hop" connection to a terminal 4. In a mobile and/or wireless communication network, the "last hop" is represented by the air interface. The communication network 3, 31, 32 is not limited to a specific network architecture and/or technology for the purposes of the invention. For example, it may be a GSM network of a UMTS network or the like. In case of a GSM network, the core network 31 includes a home location register HLR, mobile switching centers MSC, serving mobile location centers SMLC and (at least one) gateway mobile location center GMLC. Similarly, in case of a UMTS network, the core network includes substantially the same components with the exception that the HLR in a UMTS network corresponds to a home subscriber server HSS. In case of a GSM network, the access network 32 includes base station controllers BSC each controlling a plurality of base stations BS via which the terminals 4 communicate over the air interface. In case of a UMTS network, the access network 32 includes radio network controllers RNC, each controlling a plurality of so-called Node B's. Still further, as regards the terminals 4, in case of GSM a so-called mobile station MS may constitute the terminal. However in the case of an UMTS, a user equipment UE may constitute the terminal. Nevertheless, as a terminal other devices are conceivable as long as they are adapted to access the access network. For example, so-called personal digital assistants PDA and the like are possible to be used as terminals in connection with the invention, as long as they are capable of accessing the communication network which might also be a WLAN. Finally, a position detection system 5 can be involved in the invention. Examples for such a position detection system are the GPS system, the differential GPS system, i.e. DGPS, the Assisted-GPS system A-GPS, and others. The position detection system is only necessary in case no network based geolocation technique is used. Usage of one of the positioning algorithms such as an E-OTD or the others to determine the measurements from the mobile and from the network is equally possible. The algorithm can also be implemented at the mobile or in the network. The mobile can use a GPS or E-OTD (or any of the others) to calculate coordinates.

FIGS. 3 to 6 show examples of different signaling scenarios according to the invention. Throughout these Figures, the external network is represented by an application server AS, the core network of the communication network is represented by a GMLC/SMLC, the access network of the communication network is represented by a base station BS, the terminal is represented by a mobile station MS provided with an application client, and a position detection system is represented by a GPS system. These entities are arranged in the illustration in horizontal direction, and arrows therebetween represent signaling exchanged between the entities. The sequence of arrows in vertical direction in the illustration represents the sequence of the signaling in time. All entities are shown, though not all entities are involved in the signaling in each scenario.

It is to be noted that the subsequent signaling scenarios show examples only. Various modifications thereto are still possible and will be explained later on. Also, it is to be noted that the illustrated signaling scenarios start at a point of time corresponding to step S15 in FIG. 1.

Figure 3:
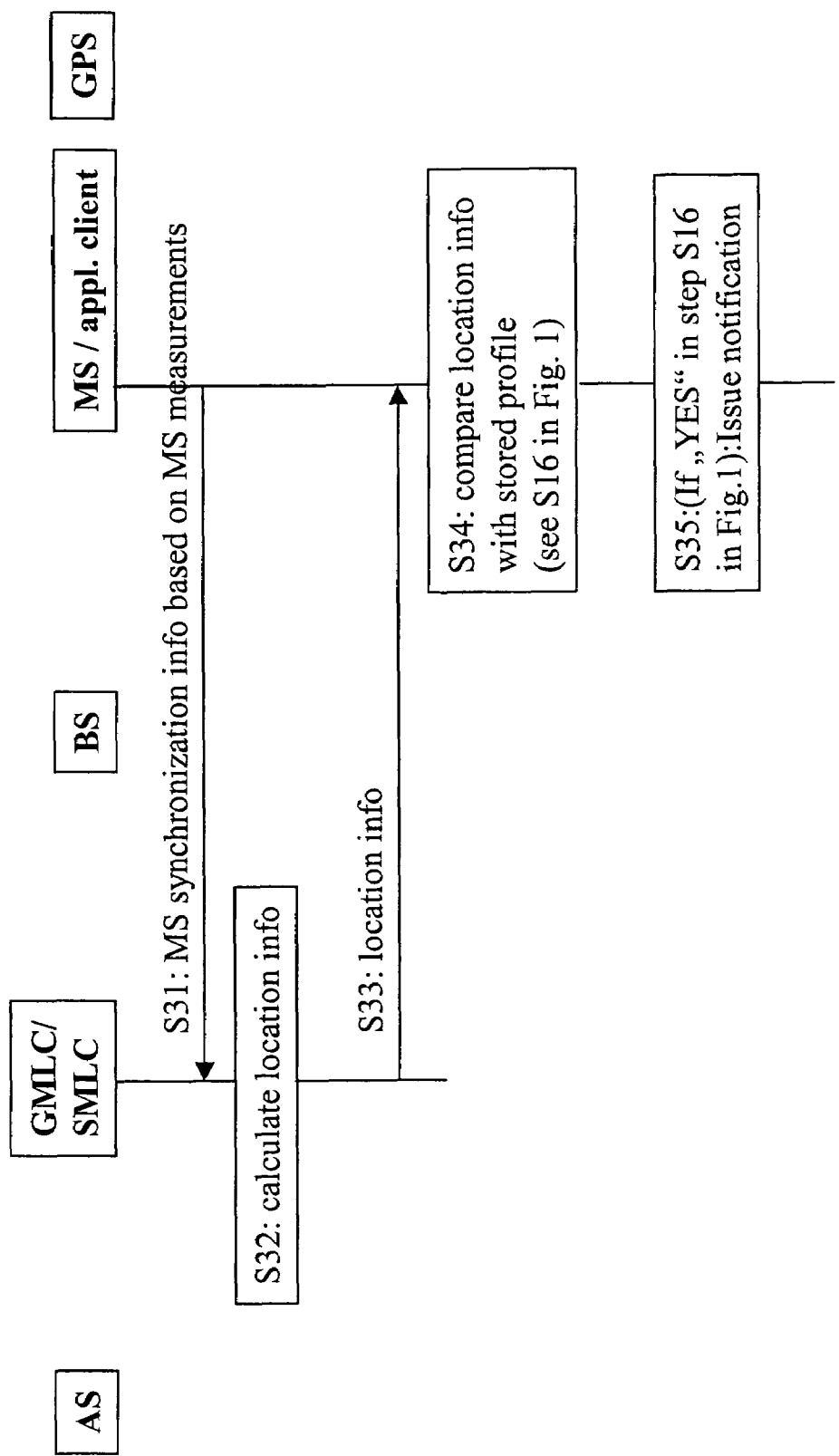
FIG. 3 shows a first signaling scenario according to the invention.

FIG. 3, for example, shows a first signaling scenario according to the invention. In this scenario, the geolocation technique used is a MS based technique, i.e. the GPS position detection system is not involved.

In step S31, the terminal MS (equipped with an application client) sends MS synchronization information based on measurements (not shown) conducted by the mobile station MS itself. For example only, in connection with OTD and/or E-OTD geolocation, the terminal MS monitors signals of plural base stations, and transmits the thus obtained synchronization information to the GMLC/SMLC.

In step S32, at the GHMLC/SMLC, location information is calculated based on the synchronization information received in step S31. Then, in step S33, the calculated location information is transmitted from the GMLC/SMLC to the terminal MS.

At the terminal, in step S34, the received location information is compared with the location stored in the profile (see step S16 in FIG. 1). Then, in step S35, if the comparison generates a "Yes" response (corresponding to "YES" in step S16), a notification is issued at the terminal to the user. Optionally (not shown), the notification and/or a corresponding trigger signal (request) for the notification is forwarded from the terminal MS via the network to a third party's terminal based on the information (telephone number of third party) stored in the reminder profile.

Figure 4:
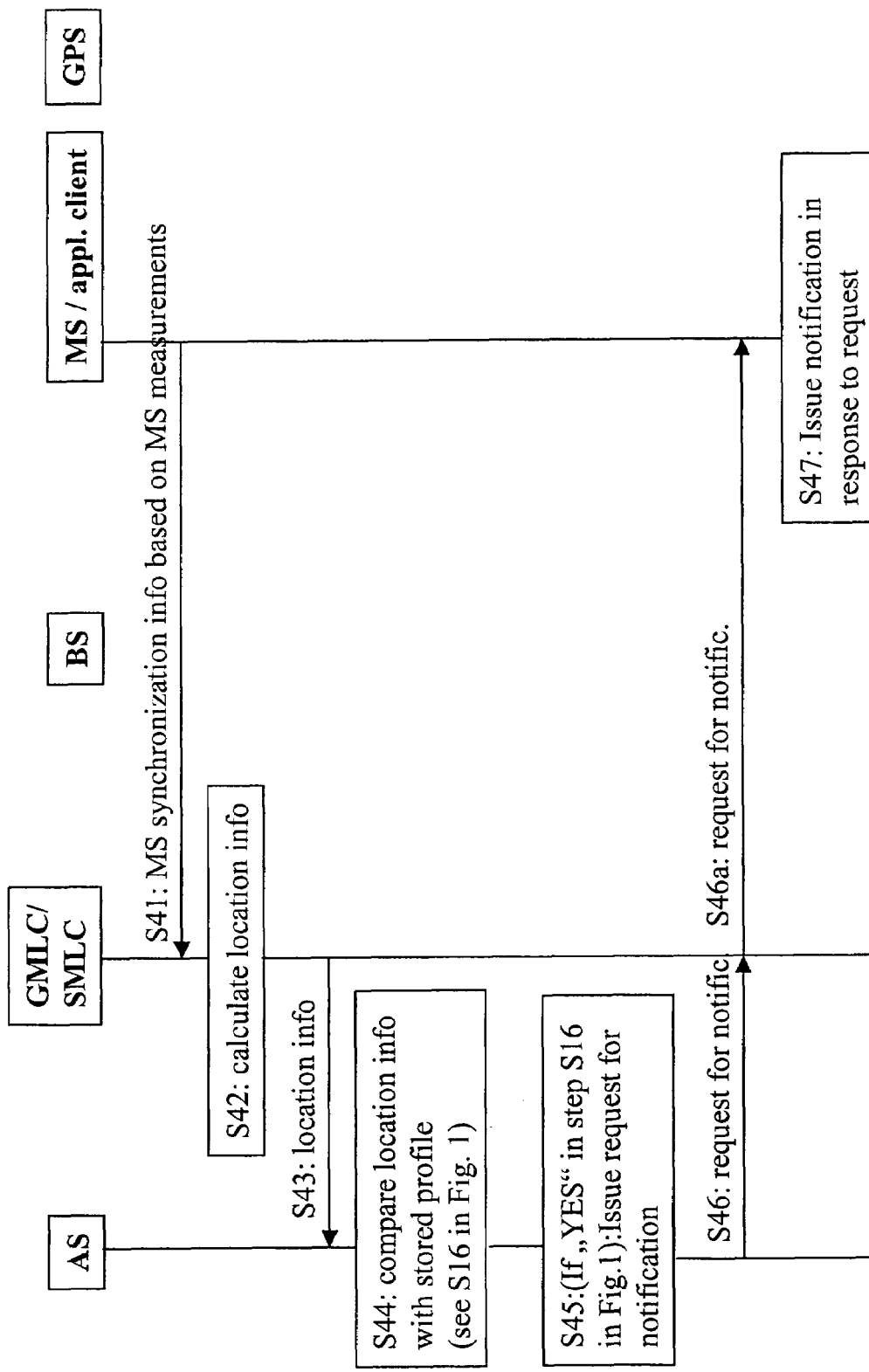
FIG. 4 shows a second signaling scenario according to the invention.

FIG. 4 shows a second signaling scenario according to one embodiment of the invention. In this scenario, the geolocation technique used is still a MS based technique as in FIG. 3, i.e. the GPS position detection system is not involved.

Steps S41 as well as S42 are similar or correspond to steps S31 and S32 in FIG. 3, so that a repeated description is omitted.

Here, the terminal is relieved from some of the processing load. To this end, in step S43, the calculated location information is transmitted to an application server AS. A subsequent step S44 corresponds to step S34 in FIG. 3, with the exception that it is processed at the application server. In step S45, if the comparison yielded "YES," the application server AS issues a request for notification. This request for notification is transmitted in steps S46, S46a via the GMLC/SMLC to the terminal MS. There, at the terminal MS, the request for notification triggers the actual issuing of the notification. Namely, in step S47, a notification is issued in response to the request. Optionally (not shown), the request for notification is forwarded from the application server AS via the network to a third party's terminal based on the information (telephone number of third party) stored in the reminder profile.

Figure 5:
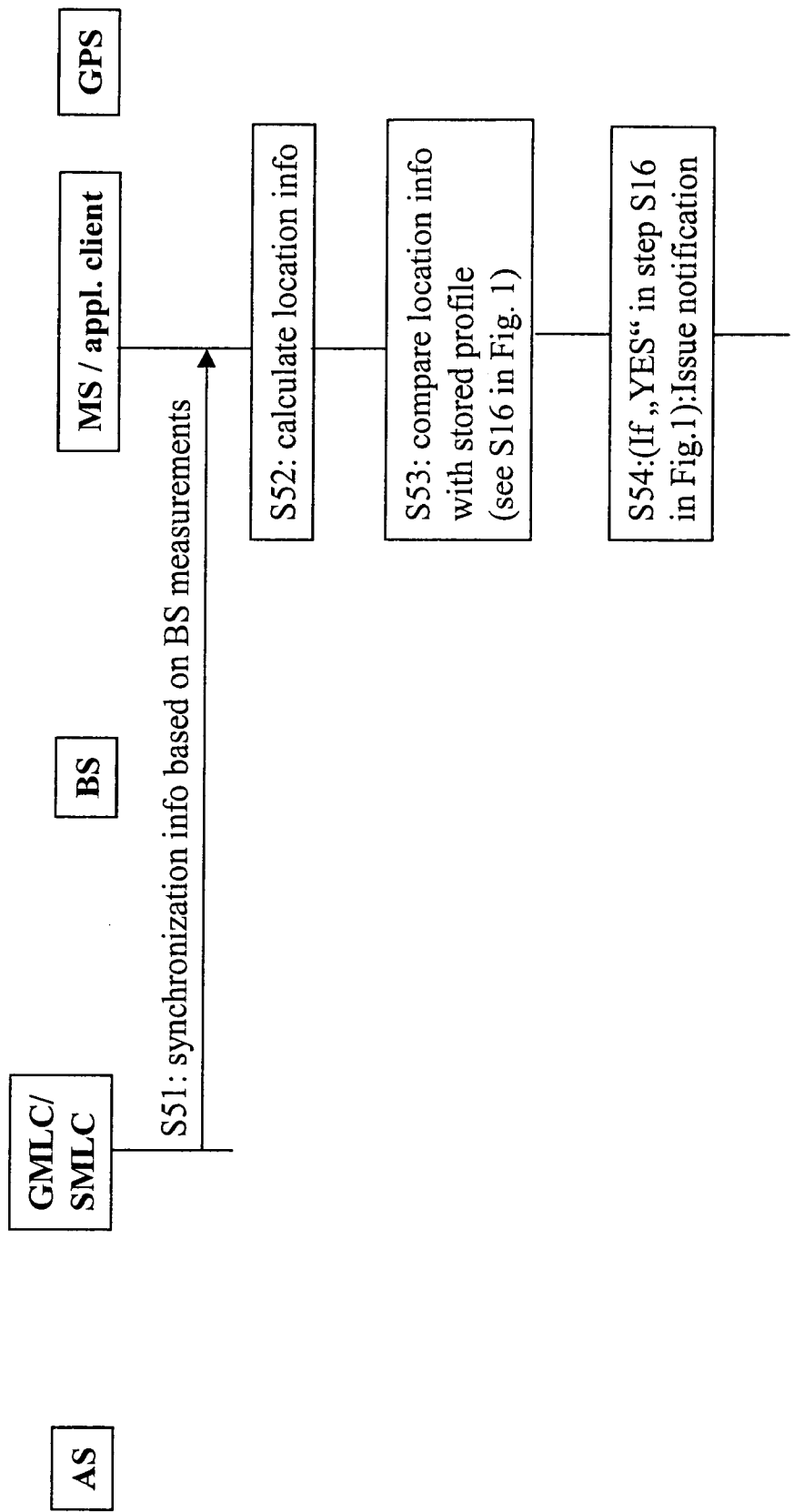
FIG. 5 shows a third signaling scenario according to the invention.

FIG. 5 shows a third signaling scenario according to the invention. In this scenario, the geolocation technique used is a network based technique, i.e. the GPS position detection system is not involved. The geolocation technique used in this scenario may for example be TOA or TDOA, in which the base stations perform a measurement on signals received from a terminal MS to thereby obtain synchronization information. (The actual measurement is not shown in the Figure.) The base stations report there measurement results to the GMLC/SMLC which derives synchronization information based on the measurement results.

As shown in step S51, the synchronization information is transmitted from the GMLC/SMLC to the terminal MS. The terminal MS, in turn, in step S52 calculates the location information, i.e. its own location, on the basis of the synchronization information. Thereafter, in step S52, the terminal MS compares the calculated location information with the one of the profile (see step S16 in FIG. 1). If in step S54 it turns out that the current calculated location matches the location of the profile ("Yes" in step S16 in FIG. 1), the terminal issues a notification to the user.

Optionally (not shown), the notification and/or a corresponding trigger signal (request) for the notification is forwarded from the terminal MS via the network to a third party's terminal based on the information (telephone number of third party) stored in the reminder profile.

Figure 6:
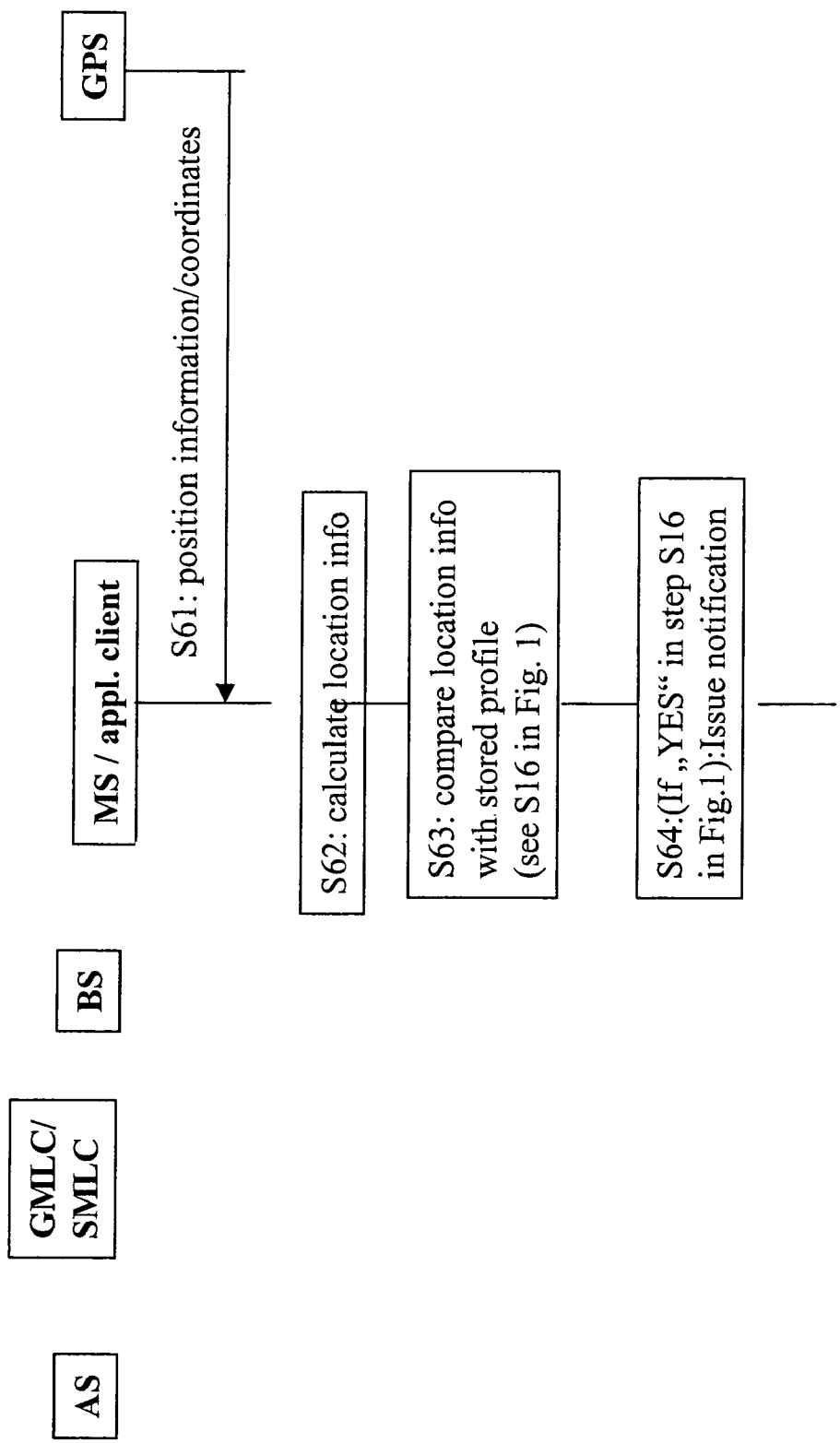
FIG. 6 shows a fourth signaling scenario according to the invention.

FIG. 6 shows a fourth signaling scenario according to another embodiment of the invention. In this scenario, the geolocation technique used is not a terminal and/or network based technique, i.e. the GPS, DPGPS, A-GPS or other "external" position detection system is now involved.

The GPS system measures the position or location of the terminal in question and supplies in step S61 the position information or coordinates to the terminal MS.

Subsequently, the terminal performs in steps S62 to S64 the same steps and/or functions as those explained above in connection with steps S52 to S54.

Optionally (not shown), the notification and/or a corresponding trigger signal (request) for the notification is forwarded from the terminal MS via the network to a third party's terminal based on the information (telephone number of third party) stored in the reminder profile.

In connection with any of the above-mentioned options of notifying a third party, it is noted that the trigger signal or request for notification may be coded by e.g. n bits so that $2^n$ notifications (for a corresponding number of events) can be distinguished. All terminals which may thus be notified based on such a request may preferably have the same notifications stored in a memory wherein the notifications are then selectively output dependent on the respective trigger signal or request.

Furthermore, various modifications to the illustrated signaling scenarios are possible. For example, in one modification, the GPS system provides the position information or coordinates to the GMLC/SMLC as shown in FIG. 3, so that S31 is replaced by step S61. Similarly, step S61 may replace step S41 in FIG. 4.

Also, the application server or client need not be physically apart from the GMLC/SMLC, but its functionality may be implemented so that the application server or client and the GMLC/SMLC are within the same network entity. In such a case, all signaling between the GMLC/SMLC and the AS is an internal signaling within a single network entity.

In the example shown in FIG. 5, S51 states that "synchronization information" based on BS measurements. In the example shown in FIG. 6, S61 states that "position information/coordinates" arriving from the GPS. In FIG. 5, synchronization information provided to the mobile when it is in charge of calculating coordinates is not based on the BS measurements in the sense of the BS performing the measurement but in the sense of the measurement concerning one or more BSs, i.e. the BS's are being measured. Actually, measurements observed by location measurement units LMU's from surrounding BTS's are reported to the MS. Those measurements in connection with the mobiles' measurements are used to determine the coordinates. In FIG. 6, in practice, it is not the coordinates as such which are provided back to the mobile from the GPS system but rather timing information (thus representing position information) that is used by the mobile to calculate its coordinates. Therefore, for the purposes of the invention, it is not necessary to actually limit how the measurements are gathered and provided because scope of the invention is broad enough to encompass the design of future architectures. According to one embodiment of the invention, the necessary measurements are collected at the terminal or at the location server and coordinates are calculated. For example, when calculated in the network, the necessary measurements collected by the mobile are provided to the location server and according to approximate BTS's and measurements collected by stationary and approximate receivers (LMU's) to the approximate BTS's the location server can calculate the mobiles' coordinates. When the mobile is performing the calculation, those measurements in which the location server already has on hand are provided to the mobile, and the mobile uses its own measurements in connection with those measurements to calculate its coordinates. Generally, for the purposes of the invention, the necessary signal measurements are collected at the appropriate place and the coordinates are calculated according to one of the mentioned positioning algorithms. Also, instead of timing information, any call synchronization information signal measurements can be used, such as angle measurements (e.g. in connection with angle of arrival algorithm (AOA).

FIG. 7A, for example, shows a basic hardware realization of an application server/application client adapted for use in connection with the invention and FIG. 7B shows a basic hardware realization of a terminal/application client adapted for use in connection with the invention.

With reference to the example shown in FIG. 7A, an application server 1a includes an application client 1a1. The application client 1a1 in turn includes an input/output interface I/O I/F 1a13 via which the application client bidirectionally exchanges data, commands and/or requests with the communication network, e.g. represented by the GMLC. For example, the application client receives via the interface the reminder profile and/or other data, which is stored in an associate memory 1a12. Furthermore, the application client includes a processing mechanism 1a11, connected to the memory 1a12 and the interface 1a13 via a bus. The processing mechanism performs steps S44 and S45 shown in FIG. 4 and all other necessary processing for controlling the input/output to/from the application server/client as well as the writing to and reading from the memory 1a12. Other entities of the application client (not shown) are also connected to the bus.

With reference to FIG. 7B, a terminal 4a is assumed to be a wireless and/or mobile terminal such as a MS. The terminal 4a thus includes an antenna 4a3 connected to a transceiver 4a2. The transceiver transmits and receives any data from and to the terminal via the antenna 4a3. Associated to the transceiver is a control mechanism with a memory CTRL&MEM 4a5 which controls the transceiver and buffers any data as necessary. Further, connected to the control mechanism 4a5 is a man machine interface MMI 4a4 such as a keyboard/display arrangement via which the user of the terminal may enter various commands such as dialing a phone number or specifying the reminder profile.

Furthermore, the terminal 4a includes an application client 4a1. The application client 4a1 in turn includes an input/output interface I/O I/F 4a13 via which the application client bidirectionally exchanges data and/or commands/requests with and/or via the terminal, e.g. represented by the control mechanism 4a5. For example, the application client receives via the interface the reminder profile (entered by the user via the MMI 4a4) and/or other data, which is stored in an associate memory 4a12.

Furthermore, the application client includes a processing mechanism 4a11, connected to the memory 4a12 and the interface 4a13 via a bus. The processing mechanism performs steps S52 to S54 shown in FIG. 5 and/or steps S62 to S64 shown in FIG. 6 and all other necessary processing for controlling the input/output features to/from features of the application client as well as the writing to and reading from the memory 4a12. Other entities of the application client (not shown) are also connected to the bus.

Optionally, the definition mechanism need not be located at the terminal. Rather, the definition mechanism may reside at the network operator's side and the network operator defines various reminder profiles to be downloaded by the user of a respective terminal and optionally adapted according to the user's specific needs.

Accordingly, as has been described herein above, the invention concerns a method of reminding a user subscribed to a communication network, and a corresponding location reminder service architecture. With regard to the method concerned, the method includes the steps of defining, S11-S13, a reminder profile for a specific terminal, 4, and of acquiring, S15, location information for specific terminal 4 attached to communication network 3, 31, 32. Furthermore, the method involves the steps of comparing, S16, acquired location information with defined reminder profile, and if acquired location information matches a defined reminder profile, a step of issuing, S17, a trigger signaling to at least one user, and outputting a reminder notification to at least one user at respective user terminal.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

The invention claimed is:

1. A method, comprising:
   providing for reminding a user subscribed to a communication network;
   defining a defined reminder profile for a specific terminal;
   acquiring location information for said specific terminal attached to said communication network;
   comparing said acquired location information with said defined reminder profile;
   if said acquired location information matches said defined reminder profile, issuing a trigger signaling to at least one user;
   outputting a reminder notification to said at least one user at a respective user terminal,
   transmitting the trigger signaling via signaling channels, the trigger signaling being a request for notification which is coded by a number of bits so that a plurality of notifications for a corresponding number of a plurality of events can be distinguished.

2. The method according to claim 1, wherein defining comprises defining the defined reminder profile to comprise at least one a reminder location, and a spatial reminder range defined with reference to said reminder location.

3. The method according to claim 2, wherein defining comprises defining the defined reminder profile to comprise a temporal reminder range defined with reference to at least one of a current date and time.

4. The method according to claim 1, wherein acquiring comprises acquiring the location information based on a geolocation technique.

5. The A method according to claim 4, wherein acquiring comprises selecting said geolocation technique from one of:
Global Positioning System;
Assisted-GPS;
Observed Time Difference;
Time Of Arrival;
Time Difference of Arrival;
Angle of Arrival;
multipath fingerprinting;
Timing Advance;
Enhanced Forward Link Triangulation;
Time Difference of Arrival & Received Signal Strength;
Time Difference of Arrival & Angle of Arrival;
Assisted Forward Link Triangulation & Assisted GPS; and
Enhanced Observed time Difference & Assisted GPS.

* * * * *